United States Patent
Barry et al.

(10) Patent No.: US 6,538,777 B1
(45) Date of Patent: Mar. 25, 2003

(54) METHOD FOR ESTABLISHING CONNECTIONS BY ALLOCATING LINKS AND CHANNELS

(75) Inventors: Richard A. Barry, Brookline, MA (US); Suresh Subramaniam, Kingstowne, VA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/182,692

(22) Filed: Oct. 29, 1998

Related U.S. Application Data

(60) Provisional application No. 60/075,201, filed on Feb. 18, 1998.

(51) Int. Cl.$^7$ ............................................. H04J 14/02
(52) U.S. Cl. ....................... 359/110; 359/135; 359/119; 370/370
(58) Field of Search ................. 359/124, 125, 359/133, 119, 135, 118, 137, 138, 139, 117, 128, 127; 370/370, 380, 431, 465, 351

(56) References Cited

U.S. PATENT DOCUMENTS

| | | | | |
|---|---|---|---|---|
| 5,566,014 A | * | 10/1996 | Glance | 359/124 |
| 5,612,805 A | * | 3/1997 | Fevrier et al. | 359/124 |
| 5,751,454 A | * | 5/1998 | MacDonald et al. | 359/119 |
| 5,781,537 A | * | 7/1998 | Ramaswani et al. | 370/254 |
| 5,959,749 A | * | 9/1999 | Danagher et al. | 359/124 |
| 5,999,290 A | * | 12/1999 | Li | 359/127 |
| 6,073,248 A | * | 6/2000 | Doshi et al. | |
| 6,084,858 A | * | 7/2000 | Matthews et al. | |
| 6,108,304 A | * | 8/2000 | Abe et al. | |
| 6,108,311 A | * | 8/2000 | Ramaswani et al. | 370/258 |
| 6,215,763 B1 | * | 4/2001 | Doshi et al. | 370/216 |

OTHER PUBLICATIONS

Subramaniam, S. and Barry, R., "Wavelength Assignment in Fixed Routing WDM Networks," in *Proc. IEEE ICC,* Montreal, P.Q., Canada, pp. 406–415, (Nov. 1997).

Jeong, G. and Ayanoglu, E., "Comparison of Wavelength–Interchanging and Wavelength–Selective Cross–Connects in Multiwavelength All–Optical Networks," in *Proc. IEEE INFOCOM '96,* San Francisco, CA, pp. 156–163 (Mar. 1996).

Mokhtar, A. and Azizoglu, M., "Adaptive Wavelength Routing in All–Optical Networks," submitted to *IEEE/ACM Transactions on Networking.*

(List continued on next page.)

*Primary Examiner*—Leslie Pascal
*Assistant Examiner*—Hanh Phan
(74) *Attorney, Agent, or Firm*—Hamilton, Brook, Smith & Reynolds, P.C.

(57) ABSTRACT

A method of allocating channels and paths to connections along candidate channel-paths in a network, where a candidate channel-path comprises a candidate path and candidate channel along the candidate path, is performed by determining individual effects, on the network, of selecting candidate channel-paths. These include effects on at least one channel-path, other than a candidate channel-path, which shares links with the candidate path. Candidate channel-paths are selected based on the determined effects and allocated. In a preferred embodiment, determination of the effects on the network is based on path capacity. The embodiment can be used where a single connection has been requested, or alternatively, where multiple connections have been requested. A max-sum embodiment selects candidate channel-paths by first calculating a sum of path capacity-dependent values of a set of affected paths in the network for each of plural network states resulting from candidate channel-path allocations, and then selecting the candidate channel-paths yielding a maximum sum.

62 Claims, 7 Drawing Sheets

OTHER PUBLICATIONS

Kovacevic, M. and Acampora, A., "Benefits of Wavelength Translation in All–Optical Clear–Channel Networks," *IEEE Journal on Selected Areas in Communications*, 14(5) : 868–880 (Jun. 1996).

Karasan, E. and Ayanoglu, E., "Effects of Wavelength Routing and Selection Algorithms on Wavelength Conversion Gain in WDM Optical Networks," in *Proc. IEEE/ACM Transactions on Networking*, 6 (2) : 186–196 (Apr. 1998).

Karasan, E. and Ayanoglu, E., "Effects of Wavelength Routing and Selection Algorithms on Wavelength Conversion Gain in WDM Optical Networks," LEOS 1996 Summer Topical Meeting on Broadband Optical Networks, Keystone, CO, (Aug. 1996).

Barry, R. and Subramaniam, S., "The MAX_SUM Wavelength Assignment Algorithm and its Application to WDM Rings," in *Proc. OFC'97*, (Feb. 1997).

Zhang, X., and Qiao, C., "Wavelength Assignment for Dynamic Traffic in Multi–fiber WDM Networks." International Conference on Computer Communications and Networks, Lafayette, LA (1998, Oct. 12–15).

Kar, K., et al., "Minimum Interference Routing of Bandwidth Guaranteed Tunnels with MPLS Traffic Engineering Applications," *IEEE Journal on Selected Areas in Communications*, 18(12) : 2566–2579 (Dec., 2000).

\* cited by examiner i=1 i=2 i=3

METHOD FOR ESTABLISHING CONNECTIONS BY ALLOCATING LINKS AND CHANNELS

RELATED APPLICATIONS

This application claims the benefit of U.S. Provisional Application No. 60/075,201, filed on Feb. 18, 1998, the content of which is incorporated herein by reference in its entirety.

GOVERNMENT SUPPORT

The invention was supported, in whole or in part, by a grant MDA 972-92J1038 from DARPA. The Government has certain rights in the invention.

BACKGROUND OF THE INVENTION

Optical fiber networks comprise a plurality of nodes connected together by bundles of optical fibers. Until recently, optical fiber communication technology could support only one wavelength per fiber, so making a connection through a network was a matter of selecting a series of links and particular fibers in the series of links.

Recent improvements in technology have made it possible to transmit multiple carriers of different wavelengths through a single fiber. Current technology should soon provide up to about 80 wavelengths on a single fiber, enabling a single fiber to carry 80 times as much traffic as a single-wavelength fiber. It is predicted that capacity may go as high as 128 to 160 wavelengths.

Thus routing takes on an extra dimension. Not only must a link and a fiber within that link be chosen, but an available wavelength must also be selected. Wavelength changers, which take a signal at one wavelength and convert it to another wavelength, are available, albeit they are complex and expensive.

Various routing algorithms for multiple-wavelength fiber networks have been developed in attempts to make the network operate efficiently. These algorithms are based on the current state of the network. For example, a "First to Fit" algorithm may choose the path with the lowest available wavelength, or if the path is already determined, pick the lowest available wavelength on that path. A "Most Used" algorithm selects a wavelength that is already used on the most fibers. A random algorithm selects a wavelength randomly in a uniform manner. The "Least Loaded Routing" algorithm selects a wavelength-path, that is, a wavelength and series of links, with the least congested link.

SUMMARY OF THE INVENTION

A typical problem which may result from prior algorithms is that the utilization of the particular wavelength-path chosen by the algorithm may remove from availability the only remaining link capable of providing a connection between some other pair of nodes, thereby unnecessarily reducing the availability of the network. To maximize the ability of the network to provide as many connections as possible, the present invention assigns channels such as wavelengths, and paths based, at least in part, on the state of the network after possible assignments. Where current methods look only at the current state of the candidate paths, the present invention tries to leave the network overall in a "better" or more flexible state.

In accordance with the present invention, candidate channel-paths are allocated to connections in a network, where a candidate channel-path comprises a candidate path and candidate channel along the candidate path, by determining individual effects on the network of selecting candidate channel-paths. These include effects on at least one channel-path, other than a candidate channel-path, which shares a link with the candidate path. Candidate channel-paths are selected based on the determined effects and allocated.

In a preferred embodiment, determination of the effects on the network is based on path capacity. The embodiment can be used where a single connection has been requested, or alternatively, where multiple connections have been requested.

A max-sum embodiment selects candidate channel-paths by first calculating a sum of path capacity-dependent values of a set of paths in the network for each of plural network states resulting from candidate channel-path allocations, and then selecting the candidate channel-paths yielding a maximum sum.

In a preferred embodiment, each path capacity dependent value is a path capacity multiplied by a weight associated with the path. In one alternative, the weight associated with a path p is the inverse of the path capacity of path p prior to allocating channel-paths. In another alternative, the weight for a path p is an inverse of the path capacity of network path p in its empty state with no connections. In yet another alternative, each path capacity dependent value is the path capacity associated with the path, i.e. all weights are 1. In still another embodiment, the weight for a path p is based on a prediction of the future traffic load of path p, for example, an average of past traffic load, or usage, of path In a preferred embodiment, selecting the candidate channel-paths is based on a difference, for each of plural network states resulting from channel-path allocations, of path-capacities before and after the allocation. Determining the difference comprises determining a count, for each candidate channel-path, of paths in the network whose capacities are decreased by one.

Where the network is a ring network, determining the count for a candidate channel-path further comprises, for each value i between 1 and the number of links n in the candidate channel-path: determining a minimum capacity $k_i$ for a first i links of the candidate channel-path; determining a minimum capacity $g_i$ for a last i links of the candidate channel-path; determining a first gap value $h_i^{(l)}$ equal to a number of links from the first link in candidate channel-path in a first direction to a link with link capacity less than $k_i$; and determining a second gap value $h_i^{(r)}$ equal to a number of links from a last link i in a second direction to the first link with link capacity less than $g_i$. Then $h_i^{(l)}$, $h_i^{(r)}$, the number of links in the candidate channel-path, and the total number of links in the network, are used to calculate the count.

Alternatively, determining the count for a candidate channel-path further comprises, for each candidate channel-path: determining a set of paths such that all paths in the set have a minimum capacity link in common with the candidate path at the candidate channel, and using the size of the set of paths as the count.

A max-min embodiment determines and selects the candidate channel-paths by first determining a minimum path capacity of a set of paths in the network for each possible configuration of candidate channel-path allocations, and then selecting the candidate channel-paths yielding a largest minimum.

The present invention is designed for optical fiber networks, preferably with a plurality of fibers within each link, however it is applicable to other types of networks as well. In the preferred embodiments, channels correspond to wavelengths. However, the present invention is not limited to wavelength channels in optical fiber networks. For example, in alternative embodiments, the network could use time division multiple access (TDMA) where channels correspond to time slots.

The present invention also provides benefits to networks having channel changers, in which case channel-paths can be assigned to hops between channel changers or between channel changers and source or destination nodes.

In a preferred embodiment, multiple channels are available in a single path.

In yet another embodiment, paths are preselected and only candidate channels must be allocated.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The present invention is a new method for establishing connections in networks which utilize optical fibers and wavelength division multiplexing (WDM). The method increases the usable capacity of the network, thereby permitting more connections to be established and providing more revenue to the network operator.

Figure 1:
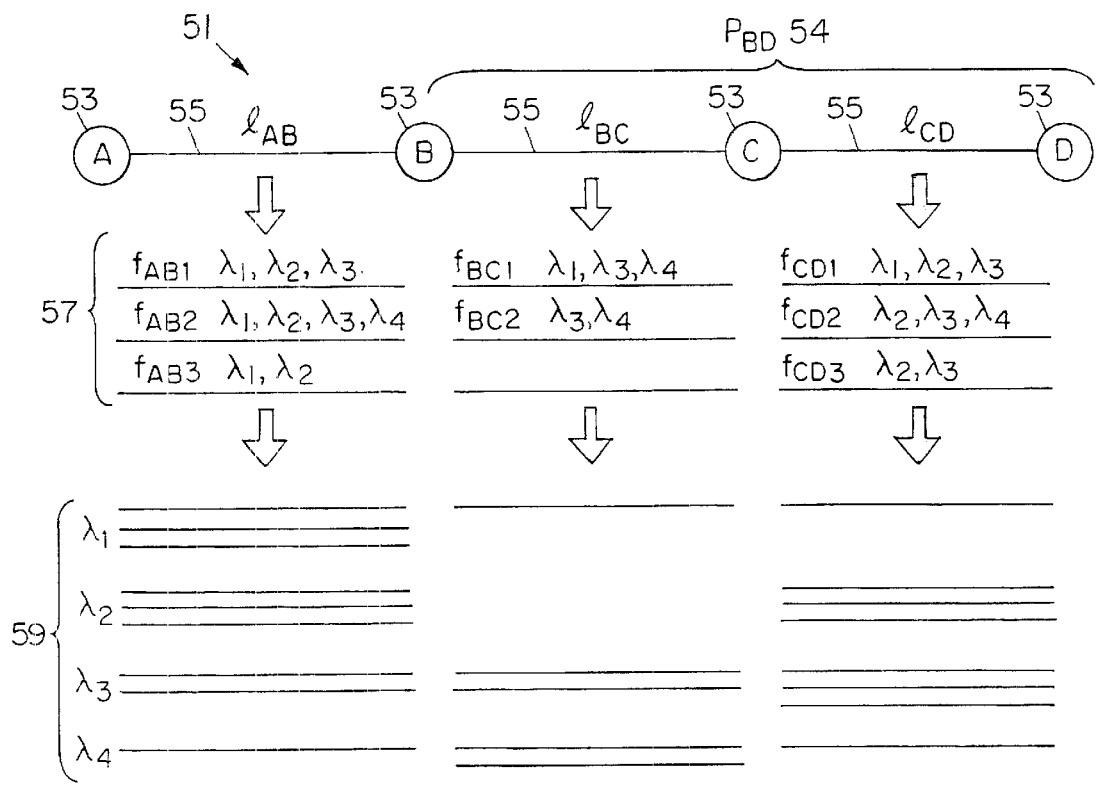
FIG. 1 is a schematic diagram showing a simple optical fiber network.

FIG. 1 shows a simple optical fiber network (OFN) 51 comprising nodes 53 connected by links 55. Each link between two nodes contains at least one optical fiber, but more likely contains many. The numbers of fibers 57 may vary from link to link. For example, link $l_{AB}$ connecting nodes A and B comprises three fibers, labeled $f_{AB1}$, $f_{AB2}$ and $f_{AB3}$, while link $l_{BC}$ connecting nodes B and C comprises only two fibers, labeled $f_{BC1}$ and $f_{BC2}$.

WDM technology accommodates a plurality of wavelength channels on each fiber. The number of channels available on different fibers may vary. Again, in the network of FIG. 1, three wavelengths are available on fiber $f_{AB1}$, $\lambda_1$, $\lambda_2$ and $\lambda_3$; while on fiber $f_{AB2}$, four wavelengths are available: $\lambda_1$, $\lambda_2$, $\lambda_3$ and $\lambda_4$. Reference number 59 shows the available channels for each wavelength in each link.

Paths connecting a source node to a destination node comprise a series of connected links starting from the source node and ending at the destination node. For example, path $P_{BD}$ 54, connecting node B to node D, comprises links $l_{BC}$ and $l_{CD}$.

Such a network can be used as the underlying transport network for a variety of higher layer networks such as ATM and SONET. In such a situation, the SONET and/or ATM switches are connected by the OFN through multiple-link optical connections. Each connection requires the allocation of a path, that is, a series of links that connect a source node to a destination node, and the allocation of a wavelength channel on the path, although the path need not be end-to-end in every case, especially where wavelength changers are used in the network.

Figure 2:
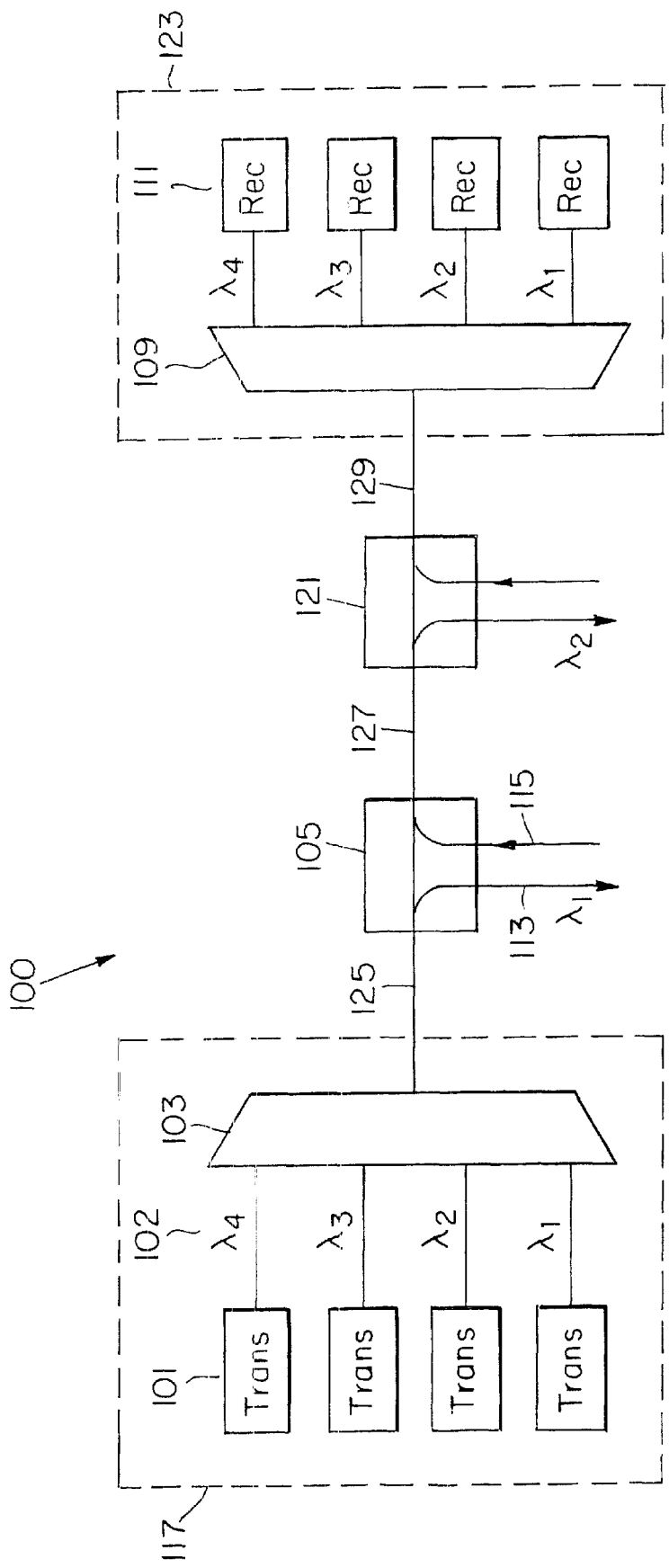
FIG. 2 is a block diagram of a network with a single optical fiber.

FIG. 2, a block diagram of a network 100 with a single fiber in each link 125, 127, 129, is intended to provide a basic understanding of how the nodes work. A source node 117 has four transmitters 101, each providing a signal 102 at a different wavelength, $\lambda_1$, $\lambda_2$, $\lambda_3$ and $\lambda_4$ respectively. These signals are combined by combiner 103 onto an optical fiber 125 which links node 117 with node 105. Node 105 passes the signals on wavelength channels $\lambda_2$, $\lambda_3$ and $\lambda_4$ on to node 121 through link 127, but the $\lambda_1$ channel is diverted to drop line 113 which may link to another node. This other node, may in turn, transmit a new signal at wavelength $\lambda_1$ which is received by node 105 at input 115 and mixed back in with the other channels to be sent along link 127 to node 121.

Node 121 behaves in a similar fashion, but drops and adds the $\lambda_2$ channel. Eventually, channels $\lambda_3$ and $\lambda_4$ from node 117, channel $\lambda_1$ from node 105 and channel $\lambda_2$ from node 121 reach destination node 123. Splitter 109 separates the different wavelengths, passing each to an appropriately tuned receiver 111.

Figure 3:
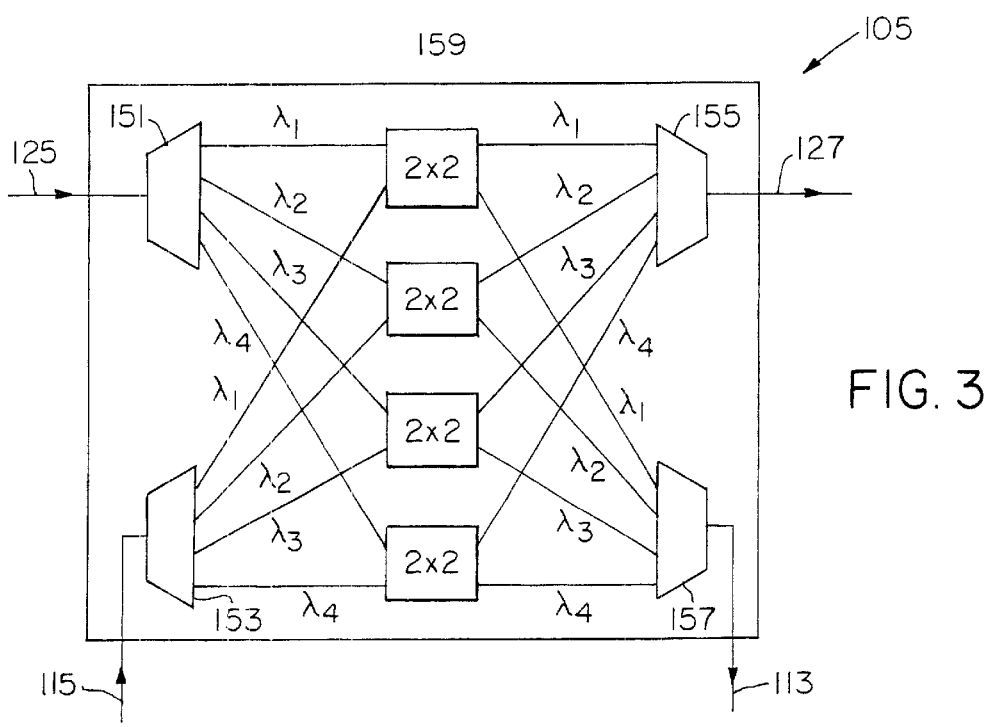
FIG. 3 is a schematic diagram of a node from the network of FIG. 2.

The nodes of the network have wavelength switches that pass incoming signals on the various wavelength channels to designated outputs. For example, FIG. 3 shows node 105 from FIG. 2 in detail. Node 105 comprises splitters 151, 153 which receive incoming signals and separate the wavelength channels. Each wavelength channel signal from each combiner 151, 153 is connected to a 2×2 switch 159. Each of the four 2×2 switches 159 is configured to route wavelength channels straight through (from link 125 to link 127, and from link 115 to link 113) or to cross them. The routed signals are then combined by combiners 155, 157. Of course, there could be more than four switches, and the switches could be larger than 2×2, depending on the number of wavelength channels and the number of input/output ports.

Switching may be done electronically, with the need for additional electro-optic conversion, or optically. However the switches are incapable of converting the data on one wavelength channel to another wavelength channel. This significantly reduces the cost of a switch, however it may lead to reduced efficiency because the same wavelength channel must be available on each link of a route for a connection to be established. Of course, it is possible to have wavelength conversion capability in a few selected switches. The present invention can easily be modified to work in such a situation.

Figure 4:
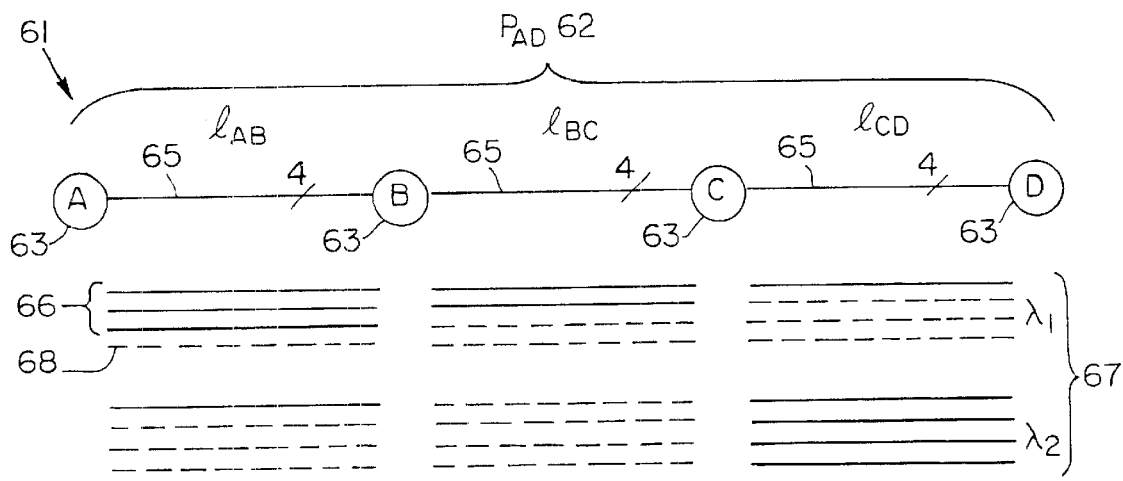
FIG. 4 is a schematic diagram of an optical fiber network showing current wavelength channel use on each link.

FIG. 4 demonstrates that although a route in a network has a wavelength channel available on each of its links, the channels are not necessarily the same wavelength, thereby causing the connection to be rejected and decreasing the efficiency. As with FIG. 1, there are four nodes labeled A,B,C and D. In this example, assume each link has four fibers and each fiber is capable of providing two wavelength channels $\lambda_1$ and $\lambda_2$. Unlike FIG. 1, solid lines in ref. 67 show which wavelength channels are currently in use while dashed lines show available wavelength channels. Here, the $\lambda_1$ channels from three of the four fibers in link $l_{AB}$ are in use. Although the other channel $\lambda_2$ is available on link $l_{AB}$, it is not available on link $l_{CD}$.

A routing and wavelength assignment (RWA) method is critically important to increasing the efficiency of such networks. The RWA method is responsible for selecting a suitable path and wavelength among the many possible choices for establishing the connection. After a wavelength-path has been selected, the transmitting lasers and receivers at various nodes are tuned to the appropriate wavelengths, and the switches are set to switch the selected wavelength channel along the selected path. Then communication can begin.

Assume that the network is in a certain state, i.e., a set of connections are already established and routes and wavelengths are assigned to those connections, and a new set of connections is requested. Each of the requested connections must be assigned wavelength-path without disturbing or rearranging the existing connections so that the network's efficiency over a long time period is maximized. It is extremely difficult to obtain an exact solution to this problem even if traffic statistics are accurately known.

The RWA method is responsible for deciding whether a connection request should be accommodated and if so, for determining a "suitable" route and wavelength for the connection. An important measure of performance for dynamic RWA methods is the probability, called the "blocking probability", that an optical circuit cannot be established for the requested connection. One of the goals of an RWA method is to attempt to minimize the probability of blocking a connection request.

A number of RWA methods have been proposed that assign a wavelength and route based on the current network state. See, for example, M. Kovacevic and A. S. Acampora, "Benefits of Wavelength Translation in All-Optical Clear-Channel Networks", IEEE J. Sel. Areas Comm., 14(5) :868–880, June 1996; A. Mokhtar and M. Azizoǧlu, "Adaptive Wavelength Routing in All-Optical Networks", to be published in IEEE/ACM Transactions on Networking, April 1998; G. Jeong and E. Ayanoglu, "Comparison of Wavelength-Interchanging and Wavelength-Selective Cross-Connects in Multiwavelength All-Optical Networks", Proc. INFOCOM '96, pages 156–163, March 1996; and E. Karasan and E. Ayanoglu, "Effects of Wavelength Routing and Selection Algorithms on Wavelength Conversion Gain in WDM Optical Networks", LEOS 1996 Summer Topical Meeting on Broadband Optical Networks, August 1996.

The present invention differs from those methods in that the state of the network after the new connections have been established is considered. The present invention tries to choose the wavelength-paths, or optical circuits, so that they leave the network in a "good" state for future connections.

The goodness of a state is measured by a new concept called the "value of the network". The value of the network is an important single-valued metric that a network operator can use for planning. This is an added advantage of the present invention over other proposed methods which do not provide a good metric of the network state for the operator.

The preferred embodiment of the present invention is based on using path capacities to calculate the network value. In particular, each path of the network has a path capacity which is defined to be the number of connections that can be established on that path. Note that the path capacities change over time and depend upon the current network state.

Suppose the network is in an arbitrary state $\psi$ and there are k requested connections. The goal is to choose a path and wavelength for each connection so that the network is in a "good" state after the connections are established. In other words, a k-vector of routes $\vec{p}$ and a corresponding vector of wavelengths $\vec{\lambda}$ need to be selected to establish the connections. This can be posed as the problem of maximizing a value function $V(\psi,\alpha)$ of the current state $\psi$ and the resulting state $\alpha$ of the network after connection establishment. The maximization is done over all possible resulting states, i.e., $\max_\alpha V(\psi,\alpha)$. In the preferred embodiment, V is a function of path capacities, formally defined below.

The value V( ) of the network is a function of the path capacities. Routes and wavelengths are assigned to connections such that the value is maximized after the new connections are established. Some particular functions are: (a) the sum of the path capacities, (b) the minimum of the path capacities, and (c) a weighted sum of the path capacities. Each of these functions may be suitable depending on the situation and the desires and priorities of the network operator. A more mathematical description is now given.

For a given state $\psi$ of the network, that is, the currently allocated paths and wavelength channels, the "link capacity" of link l on wavelength $\lambda$, $c(\psi,l,\lambda)$ is defined as the number of fibers on which $\lambda$ is available (unused) on link l. Thus, in FIG. 4, $c(\psi,l_{AB},\lambda_1)=1$, because of the four fibers in link $l_{AB}$, three, represented as solid lines 66, are already in use with respect to $\lambda_1$. Dashed lines 68 shows the available fibers for $\lambda_1$ in $l_{AB}$.

Path capacities are defined in terms of link capacities. For the network state $\psi$, the "capacity of path p on wavelength $\lambda$, $C'(\psi, p, \lambda)$ is defined as the number of fibers on which $\lambda$ is available on the most congested link along the path, i.e., $$C'(\psi, p, \lambda) \equiv \min_{l \in L(p)} c(\psi, l, \lambda) \qquad \text{(Eq. 1)}$$

where L(p) is the set of links comprising path p. Again, in FIG. 4, $L(p_{AD})=\{A_{AB}, l_{BC}, l_{CD}\}$ and the capacity of path $p_{AD}$ 62 on wavelength $\lambda_1$ is $\min(c(\psi,l_{AB},\lambda_1), \ldots, c(\psi,l_{CD},\lambda_1))$ or $\min(1, 2, 3)=1$.

The "path capacity" of a given path p when the network is in state $\psi$ is $$C(\psi, p) \equiv \sum_{f=1}^{F} C'(\psi, p, \lambda_f) \qquad \text{(Eq. 2)}$$

where F is the maximum number of wavelength channels available on a fiber in an empty network.

Therefore, in FIG. 4, $C(\psi, p_{AD})=C'(\psi, p_{AD}, \lambda_1)+C'(\psi, p_{AD}, \lambda_2)=1+0=1$.

Now, let P be the set of all possible, or candidate, paths. Then $V(\psi,\alpha)$ is a function of $C(\psi, p)$ and $C(\alpha, p)$ where $p \in P$.

Let $\Phi$ be the set of all candidate path vectors on which the connections can be routed. For each $\vec{p} \in \Phi$, let $\Omega(\psi, \vec{p})$ be the set of all candidate wavelength channels that are available to route the connections for a given path $\vec{p}$, given the current network state $\psi$. Let $\psi'(\vec{p}*, \vec{\lambda}*)$ be the resulting state of the network when $\vec{p}^*$ and $\vec{\lambda}^*$ are chosen to establish the connections. The preferred embodiment chooses the candidate path vector $\vec{p}^*$ and candidate wavelength channel $\vec{\lambda}^*$ such that $V(\psi, \psi'(\vec{p}, \vec{\lambda}))$ is maximized over all $\vec{p} \in \Phi$ for each candidate wavelength channel $\vec{\lambda} \in \Omega(\psi, \vec{p})$.

Alternate embodiments use, but are not limited to, the following value functions $V(\ )$:

$$V(\psi, \alpha) = \sum_{p \in P} C(\alpha, p) \quad (\text{Max\_Sum} (M\textstyle\sum)), \qquad 1.$$

$$V(\psi, \alpha) = \sum_{p \in P} w(p) \, C(\alpha, p) \quad (\text{Max\_Weighted\_Sum} (MW\textstyle\sum)), \qquad 2.$$

$$V(\psi, \alpha) = \min_{p \in P} C(\alpha, p) \quad (\text{Max\_Min method}), \qquad 3.$$

$$V(\psi, \alpha) = \sum_{p \in P} \frac{C(\alpha, p)}{C(\psi, p)} \quad (\text{Max\_Percentage\_Sum} (M\%\textstyle\sum)), \text{ and} \qquad 4.$$

$$V(\psi, \alpha) = \sum_{p \in P} \frac{C(\alpha, p)}{C(\varnothing, p)} \quad (\text{Max\_Empty\_Sum} (ME\textstyle\sum)) \text{ where } \varnothing \qquad 5.$$

is the empty network state.

In a preferred embodiment, the weights w(p) of the Max-Weighted-Sum function are based on predictions of future traffic load for each path, which in turn are based on past traffic load. For example, each weight $w(p_i)$. may be proportional to the average past traffic load of its corresponding path $p_i$. Of course, other predictors of traffic load can also be used.

MΣ Methods

The MΣ method has been found to perform better than other known methods for certain types of traffic in multiple-fiber ring networks. See "The MAX_SUM Wavelength Assignment Algorithm for WDM Ring Networks", R. A. Barry and S. Subramaniam, Proc. OFC '97, pages 121–122, June 1997, incorporated herein by reference.

The MΣ method chooses $\vec{p}$ and $\vec{\lambda}$ to maximize $$\sum_{p \in P} C(\alpha, p)$$

over all possible resulting states α. However, it is easier to compute a cost function $$\chi(p) = \sum_{p \in P} (C(\psi, p) - C(\alpha, p)) \qquad (\text{Eq. 3})$$

and to minimize the cost rather than compute V(ψ, α).

Unidirectional and bidirectional ring networks are discussed below, where for simplicity it is assumed that a single connection has been requested. Note that in this case the difference in path capacity between the current state and the new state is either 0 or 1 for any path. Informally stated, the MΣ method chooses the candidate wavelength-path that minimizes the number of paths whose capacities decrease by 1.

Figure 5:
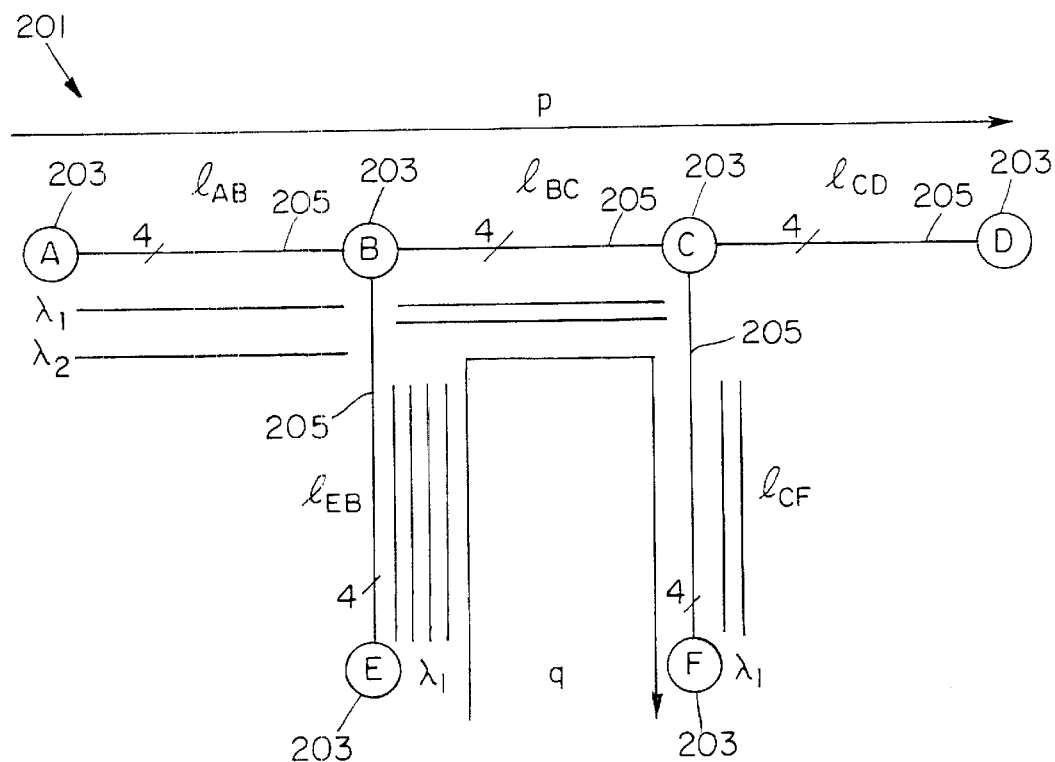
FIG. 5 is a schematic diagram of an optical fiber network with six nodes.

FIG. 5 uses a six-node network 201 to demonstrate the motivation for developing a Max_Sum function. Here there are six nodes 203 labeled A,B,C,D,E and F connected by five links 205 labeled $l_{AB}, l_{BC}, l_{CD}, l_{EB}$ and $l_{CF}$, where the order of the subscripts indicates direction of transmission. Each link 205 has four fibers and each fiber is capable of carrying two wavelength channels, $\lambda_1$ and $\lambda_2$. In the present state of the network, the current use is as follows:

| | In use | | Available | |
|---|---|---|---|---|
| Link: | $\lambda_1$ | $\lambda_2$ | $\lambda_1$ | $\lambda_2$ |
| $l_{AB}$ | 1 | 1 | 3 | 3 |
| $l_{BC}$ | 2 | 0 | 2 | 4 |
| $l_{CD}$ | 0 | 0 | 4 | 4 |
| $l_{EB}$ | 4 | 0 | 0 | 4 |
| $l_{CF}$ | 2 | 0 | 2 | 4 |

If a new connection on path p connecting nodes A and D is requested, the Least Loaded Routing (LLR) method of the prior art would choose $\lambda_2$ because $\lambda_1$ is more loaded on path p (links $l_{AB}, l_{BC}$ and $l_{CD}$). However, when the resulting state of the network including path q (links $l_{EB}, l_{EB}$ and $l_{CF}$) is taken into consideration, it can be seen that while p's path capacity is reduced by one regardless of the wavelength selected, q's path capacity is also reduced by one if $\lambda_2$ is chosen. Thus $\lambda_1$ is a better choice. The Max_Sum embodiment of the present invention is based on this reasoning.

MΣ Method With Unidirectional Rina Network With Self-Calls

Figure 6:
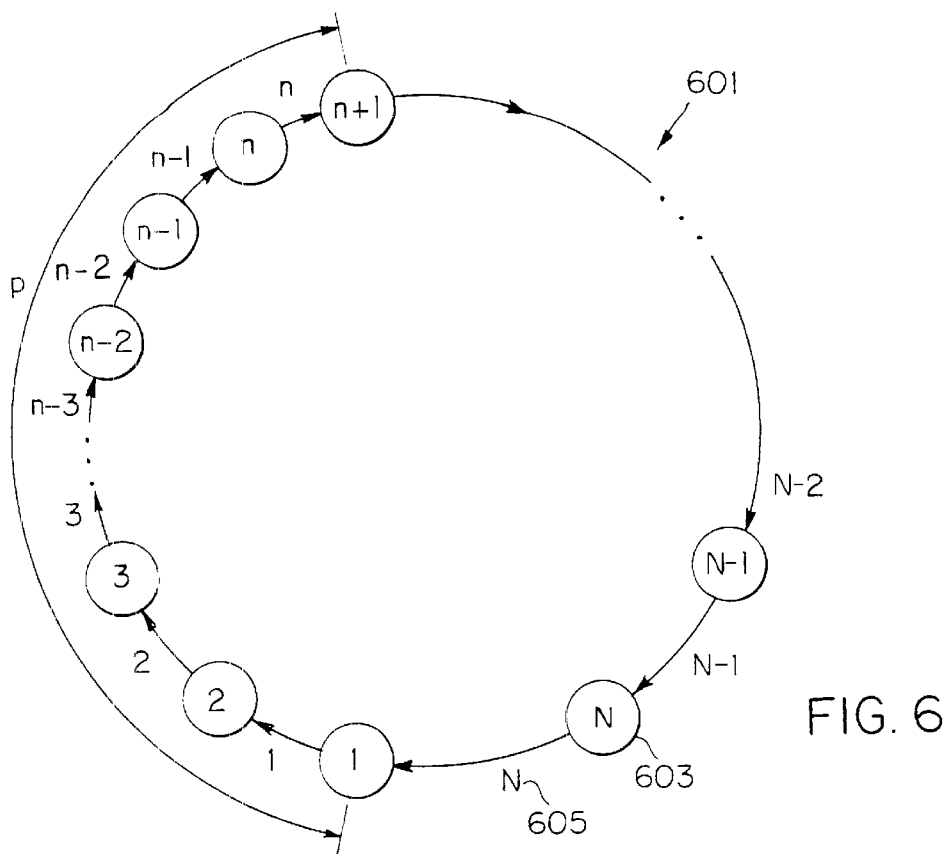
FIG. 6 is a schematic diagram of a unidirectional ring network with N nodes.

Consider the unidirectional ring network 64 of FIG. 6 having N nodes 603 and N links 605. Without loss of generality, the links of the ring are oriented in the clockwise direction and are numbered 1, 2, . . . N in the clockwise direction. Since there is only one path between any pair of nodes, the problem of route selection is trivial in this network. However, it is necessary to choose a suitable wavelength for the connection.

Assume that a connection is requested and that a connection from a node to itself can be requested. Let the connection request be for path p connecting node 1 to node n+1 so that path p comprises links 1 to n. For each candidate wavelength $\lambda \in \Omega(\psi, p)$, a cost function $\chi(p,\lambda)$ that counts the number of paths whose capacities are decreased by 1 is computed and the candidate wavelength $\lambda^*$ that minimizes the function is chosen to route the connection. Before giving the cost function, additional notation is developed.

For i=1, 2, . . . , n, define $$k_i = \min\{c(\psi,1,\lambda), c(\psi,2,\lambda), \ldots, c(\psi, i,\lambda)\}, \text{ and}$$

$$g_i = \min\{c(\psi,n,\lambda), c(\psi,n-1,\lambda), \ldots, c(\psi,n-i+1, \lambda)\}.$$

Figure 7A:
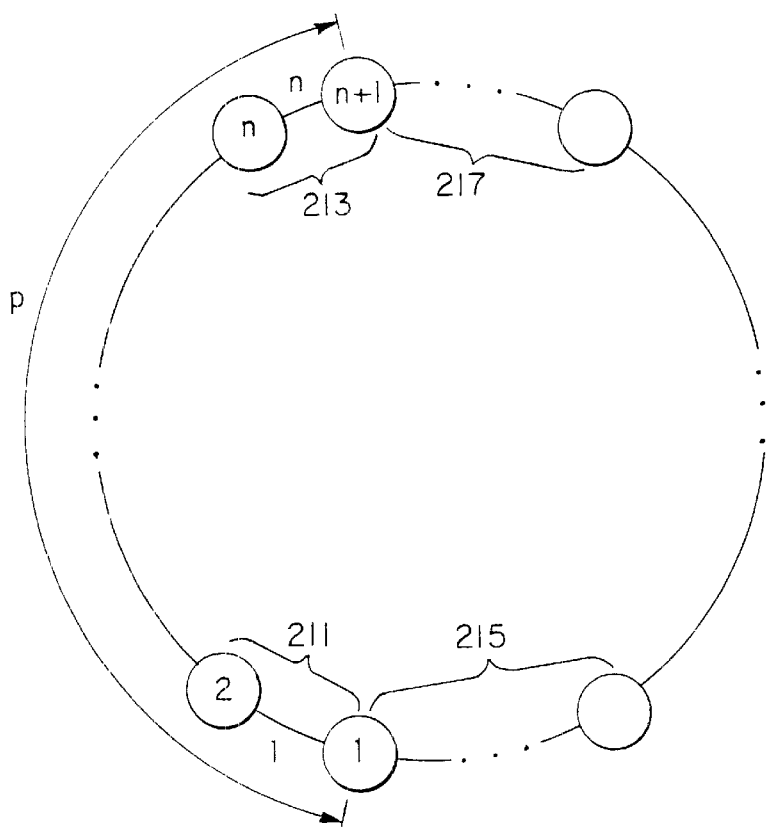
FIGS. 7A, 7B and 7C are schematic diagrams of the ring network of FIG. 6 showing the first and last i links of a requested path for i=1, 2 and 3 respectively.
Figure 7B:
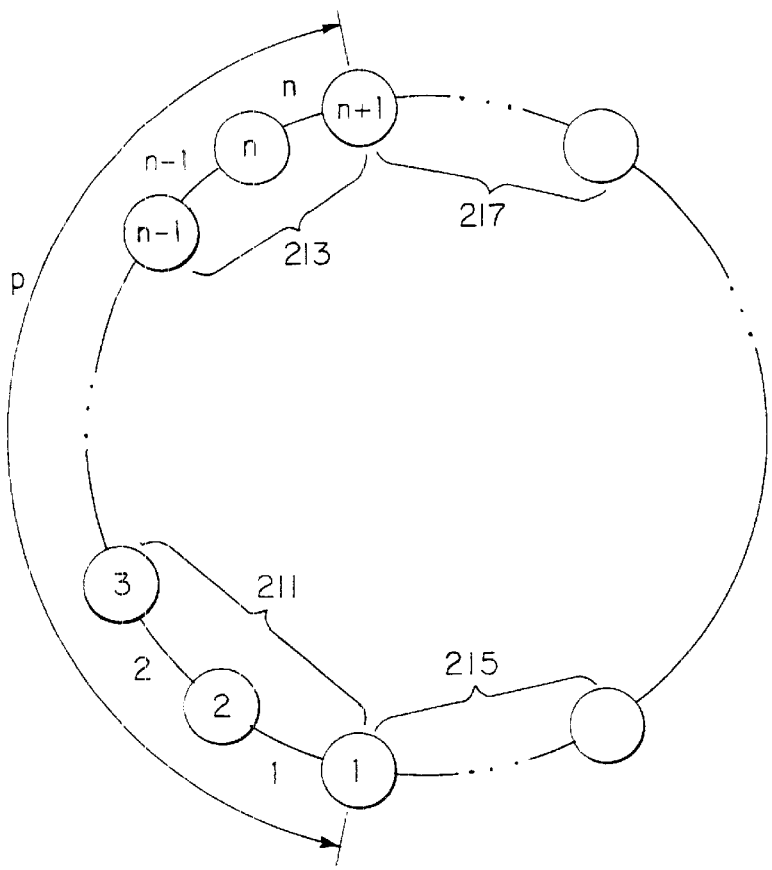
Figure 7C:
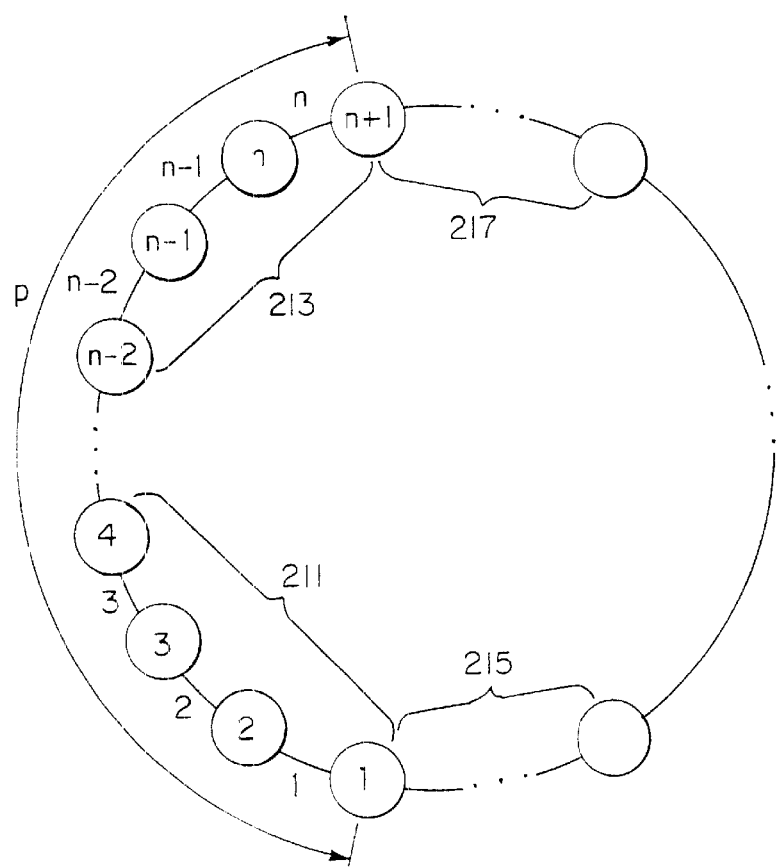

Here, $k_i$ is the number of fibers on which λ is available on the most congested link on λ of the first i links of path p, and $g_i$ is the number of fibers on which λ is available on the most congested link on λ of the last i links of the path. This is demonstrated more clearly in FIGS. 7A–7C which show the first i links 211 and the last i links 213 of path p, for i=1, 2 and 3 respectively.

Let $h_i^{(l)}$ be the left gap 215, or the number of links, from link 1 until a link with capacity less than $k_i$ is encountered in a counter-clockwise direction and, similarly, let $h_i^{(r)}$ be the right gap 217 from link n until a link with capacity less than $g_i$ is encountered in a clockwise direction. Formally stated, if $L_i$ is the set of links $\{l: n+1 \leq l \leq N, c(\psi, l, \lambda) < k_i\}$ and $R_i$ is the set of links $\{r: n+1 \leq r \leq N, c(\psi, r, \lambda) < g_i\}$, then if $L_i$ is empty (=ø), $h_i^{(l)} = N-i$; otherwise, $h_i^{(l)} = N-\max L_i$. If $R_1$ is empty (=ø), $h_i^{(r)} = N-n$; otherwise, $h_i^{(r)} = \min R_i - n - 1$.

Finally, define $u(\lambda, \psi)$ as the number of fibers in the network on which candidate wavelength λ is currently in use.

The cost function $\chi(p,\lambda)$ for candidate wavelength $\lambda$ can now be written as follows:

$$\chi(p,\lambda) = N^2 \quad n = N \quad \text{(Eq. 4)}$$
$$N^2 - (N-n)(N-n+1)/2 \quad n < N, u(\psi,\lambda) = 0$$
$$\frac{(N-n)(N-n-1)}{2} + \frac{n(n+1)}{2} + \sum_{i=1}^{n}\left(h_i^{(l)} + h_i^{(r)}\right)$$
$$n < N, u(\psi,\lambda) \neq 0, h_n^{(l)} = N-n$$
$$h_n^{(l)}h_n^{(r)} + \frac{n(n+1)}{2} + \sum_{i=1}^{n}\left(h_i^{(l)} + h_i^{(r)}\right)$$
$$n < N, u(\psi,\lambda) \neq 0, h_n^{(l)} \neq N-n$$

Note that if $h_n^{(l)} \equiv N-n$, then $h_n^{(r)} \equiv N-n$ and if $h_n^{(l)} \neq N-n$, $h_n^{(l)} \neq N-n$.

Equation (4) is derived as follows. When the length of the requested connection's path is N, clearly the capacity of all $N^2$ paths in the network is reduced by 1 irrespective of which wavelength is assigned to the requested connection.

Now suppose n<N. If $\lambda$ is not used on any fiber in the network, i.e. $u(\lambda,\psi)=0$, then the paths whose capacities decrease by 1 are exactly those paths that interfere with the new call's path and this number is $N^2-(N-n)(N-n+1)/2$.

If $\lambda$ is used on some fiber in the network, the third or fourth formula is used. If $h_n^{(l)}=h_n^{(r)}=N-n$, i.e., there is no link outside p that is more congested on $\lambda$ than the most congested link on $\lambda$ inside p, the third formula is used. The first term counts those paths that originate at a node to the left of the call's source and terminate at a node to the right of the call's destination. The second term counts those paths that lie entirely within the requested connection's path. In the third term, for each i, $h_i^{(l)}$ counts those paths that originate at any node (including nodes within the call's path) and have i as their last link. $h_i^{(r)}$ counts those paths whose first link is n−i+1 and last link is >n.

If $h_n^{(l)} \neq N-n$, then the fourth formula is used. The first term counts those paths that originate at a node inside the left gap and terminate inside the right gap completely containing the new call's path. The other two terms are the same as in the third formula.

If d=1, where d is the maximum number of fibers on a link, the above equation simplifies and reduces to $$\chi(p,\lambda) = N^2 \quad n = N \quad \text{(Eq. 5)}$$
$$N^2 - (N-n)(N-n+1)/2 \quad n < N, u(\psi,\lambda) = 0$$
$$(n+h^{(l)})(n+h^{(r)}) - \frac{n(n+1)}{2} \quad n < N, u(\psi,\lambda) \neq 0$$

where $h^{(l)}$ ($h^{(r)}$) is the left (right) gap from the source (destination) of the new connection to a link on which $\lambda$ is used.

M$\Sigma$ Method With Unidirectional Ring Network With No Self-Calls

If a node is not allowed to connect to itself, then n<N, and the formulas change slightly. With the same definition of $L_i$, if $L_i=\emptyset$, redefine $h_{i(l)} \equiv -N-i-1$ instead of N−i. Otherwise, the definition remains the same as before. The cost function for wavelength $\lambda$ is $$\chi(p,\lambda) = N(N-1) - (N-n)(N-n+1)/2 \quad u(\psi,\lambda) = 0 \quad \text{(Eq. 6)}$$
$$\frac{(N-n-1)(N-n-2)}{2} + \frac{n(n+1)}{2} + \sum_{i=1}^{n}\left(h_i^{(l)} + h_i^{(r)}\right)$$
$$u(\psi,\lambda) \neq 0, h_n^{(l)} = N-n$$
$$h_n^{(l)}h_n^{(r)} + \frac{n(n+1)}{2} + \sum_{i=1}^{n}\left(h_i^{(l)} + h_i^{(r)}\right)$$
$$u(\psi,\lambda) \neq 0, h_n^{(l)} \neq N-n$$

If d=1, where d is the maximum number of fibers on a link, the above simlifies and reduces to $$\chi(p,\lambda) = N(N-1) - (N-n)(N-n+1)/2 \quad u(\psi,\lambda) = 0 \quad \text{(Eq. 7)}$$
$$(n+h^{(l)})(n+h^{(r)}) - \frac{n(n-1)}{2} \quad u(\psi,\lambda) \neq 0$$

where $h^{(l)}$ (respectively $h^{(r)}$) is the left (right) gap from the source (destination) of the new connection to a link on which $\lambda$ is used.

M$\Sigma$ Method With Bidirectional Ring Network

Figure 8:
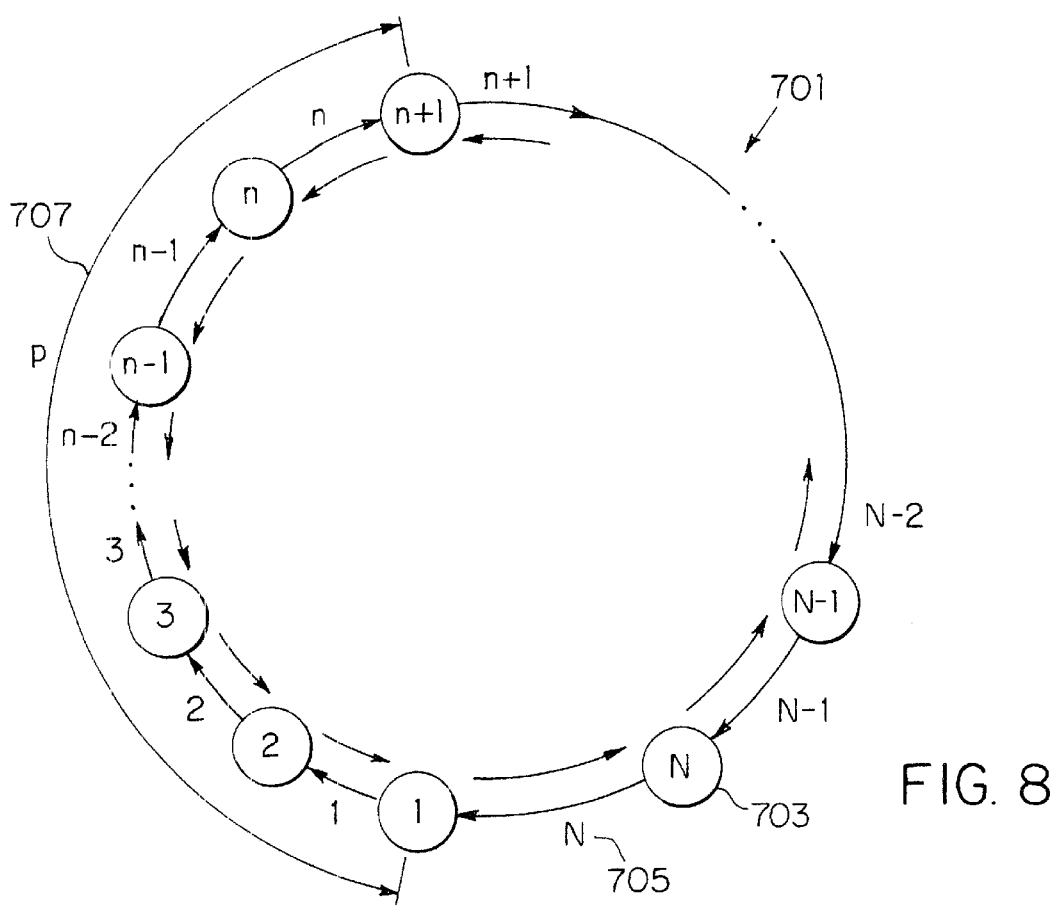
FIG. 8 is a schematic diagram of bidirectional ring network with N nodes.

Now consider the N-node ring network 701 of FIG. 8 having N nodes 703 and N bidirectional links 705 and suppose that all connections are routed on the shortest path around the ring. For simplicity, N is assumed to be even and self-connections are not allowed. The network is pictured as two unidirectional rings (clockwise and counterclockwise rings) with the links going in opposite directions. The links in the clockwise direction are numbered 1, 2, ... N. Without loss of generality, let the requested connection use links 1 through n (n≤N/2), and let p 707 be the path on which the connection is routed. As before, the cost function for each candidate wavelength $\chi(p,\lambda)$ is computed and the candidate wavelength $\lambda^*$ that minimizes the function is chosen to route the connection.

Define as before, for i=1, 2, ..., n:

$k_i = \min\{c(\psi,1,\lambda), c(\psi,2,\lambda), \ldots, c(\psi,i,\lambda)\}$, and $g_i = \min\{c(\psi,n,\lambda), c(\psi,n-1,\lambda), \ldots, c(\psi,n-i+1,\lambda)\}$ The gaps $h_i^{(l)}$ and $h_i^{(r)}$ are computed as follows. Let $$L_i = \left\{l: \frac{N}{2} + i + 1 \leq l \leq N, c(\psi, l, \lambda) < k_i\right\} \text{ and let} \quad \text{(Eq. 8)}$$

$$R_i = \left\{r: n+1 \leq r \leq \frac{N}{2} - i, c(\psi, r, \lambda) < g_i\right\}.$$

$$h_i^{(l)} = \begin{cases} \frac{N}{2} - i & L_i = \emptyset \\ N - \max L_i & \text{otherwise.} \end{cases}$$

$$h_i^{(r)} = \begin{cases} \frac{N}{2} - i & R_i = \emptyset \\ N - \min R_i & \text{otherwise.} \end{cases} \quad \text{(Eq. 9)}$$

Then, $$\chi(p,\lambda) = h_n^{(l)}h_n^{(r)} + \frac{n(n+1)}{2} + \sum_{i=1}^{n}\left(h_i^{(l)} + h_i^{(r)}\right). \quad \text{(Eq. 10)}$$

Note that the worst-case time complexity of the M$\Sigma$ method with this implementation is O(NF) where N is the number of nodes in the network.

MΣ Method With Arbitrary Topologies

Figure 9:
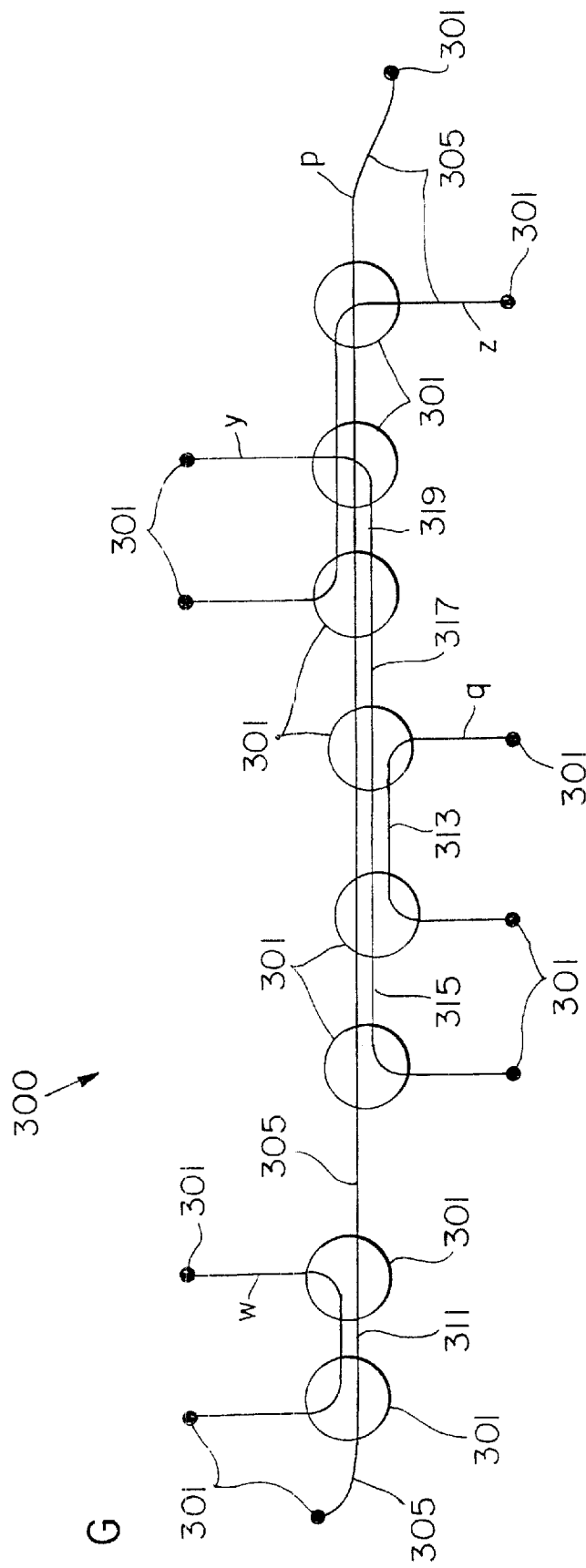
FIG. 9 is a schematic diagram of an arbitrary network.

FIG. 9 is a graph G=(V, E) of an arbitrary mesh network 300 with fixed routing, where V is the set of nodes 301 and E is the set of links 305 (each consisting of many fibers).

P is the set of fixed paths between node-pairs. Five paths are shown, labeled p, q, w, y and z. Various paths have certain links in common. For example, link 311 is used by both paths w and p, links 315 and 317 are used by both paths y and p. Link 313 is used by paths y, q and p. Link 319 is used by paths z, y and p. Link 321 is used by both paths z and p.

Figure 10:
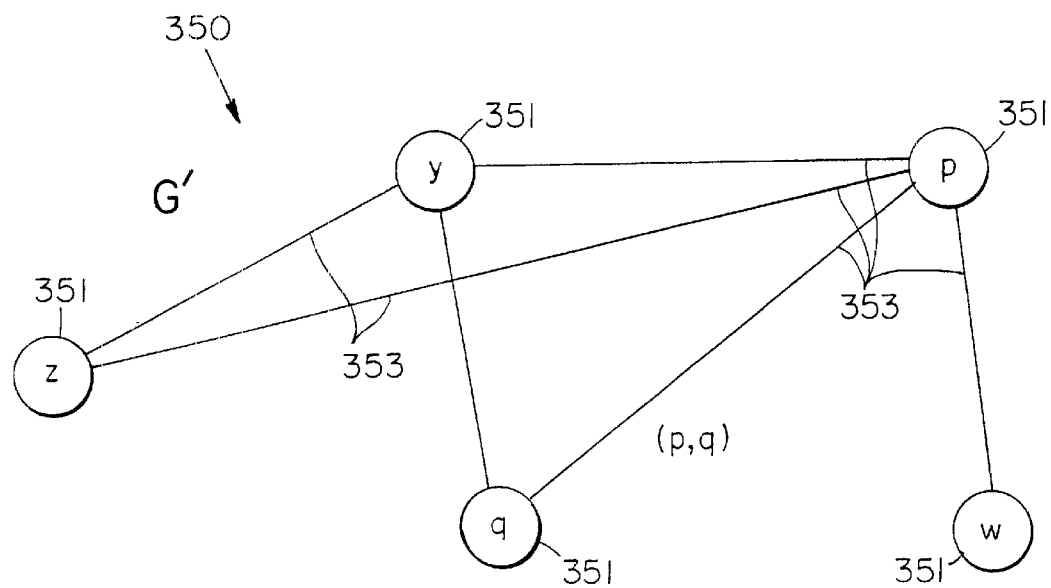
FIG. 10 is a conflict graph for the network of FIG. 9.

As shown in FIG. 10, a "conflict graph" 350 G' (P, E') is generated where the nodes 351 of G' correspond to paths p∈P, and each undirected edge 353, e.g. (p,q) shown connecting the two nodes (p and q), is an element of E' if and only if the paths (p and q) share a common link.

Suppose a connection is to be established on path p. For each wavelength, a cost function $\chi(p,\lambda)$ that counts the number of paths whose capacities are decreased by one in the new state is computed as follows. Recall that L(r) is the set of links on path r. Now, define $$M_\lambda(r) = \{l \in L(r) : c(\psi, l, \lambda) \leq c(\psi, m, \lambda) \text{ for all } m \in L(r)\} \quad \text{(Eq. 11)}$$

to be the set of links of some path r which have the minimum capacity on wavelength $\lambda$. Next, define $$R_{p,\lambda} = \{r : (p,r) \in E', M_\lambda(r) \cap L(p) \neq \emptyset\} \quad \text{(Eq. 12)}$$

to be the set of those paths that have a minimum capacity link on wavelength $\lambda$ lying on path p. We can now write $\chi(p,\lambda) = |R_{p,\lambda}|$ as the cost of using wavelength $\lambda$.

Note that the worst-case time complexity of the methods using the conflict graph framework is O(|P|NF) assuming the conflict graph is generated offline.

The implementation on arbitrary topologies can be easily extended to consider adaptive routing on a set of k fixed alternate paths. The conflict graph is generated offline by considering all the k paths for each node-pair. The method assigns a cost function $\chi(p_i,\lambda)$ for each of the k paths $p_1, p_2, \ldots, p_k$ as above. The wavelength and route that minimize the cost function over all wavelengths and k paths are then chosen to establish the connection.

Max_Min Method With Rings

In a unidirectional ring with self-connections allowed, in any state, any of the N paths that traverse the entire ring (from a node to itself) is a minimum capacity path. In a single-fiber network, if a wavelength $\lambda$ is used on some link in the network, then the minimum path capacity is 0; otherwise the minimum path capacity is 1. In this case, the Max_Min algorithm chooses a candidate wavelength that is already used somewhere in the network because the capacity of the minimum capacity path on such a wavelength is already 0.

In multi-fiber unidirectional rings, the minimum capacity on a wavelength $\lambda$ is equal to the capacity on the most congested link on $\lambda$ in the ring, i.e., minimum capacity=$\min_i c(\psi,i,\lambda)$. So, the cost function for candidate wavelength $\lambda$ to be used on path p is $$\chi(p, \lambda) = \min_i c(\psi, i, \lambda). \quad \text{(Eq. 13)}$$

The formulas for bidirectional rings can also be worked out easily for the Max_Min method.

Max_Min With Arbitrary Topologies

In arbitrary topologies, Max_Min can be implemented as follows. The capacity of every path p∈P is tracked. (Recall that P is the set of candidate paths.) Furthermore, the set of minimum capacity paths in the network $S_{min}$ is also tracked. Let the minimum, e.g. the capacity of a minimum capacity path, be denoted by $C_{min}$. Initially, the capacity of every path is Fd where F is the number of wavelengths available on a fiber, and d is the maximum number of fibers in a link. Suppose a connection on path p is to be assigned a wavelength. For each candidate wavelength $\lambda$, define $R_{p,\lambda}$ as above for MΣ (Eq. 12). Then, a cost function $\chi(p, \lambda)$ can be defined as follows.

$$\chi(p, \lambda) = \begin{cases} 1 & R_{p,\lambda} \cap S_{min} \neq \emptyset \\ 0 & \text{otherwise} \end{cases} \quad \text{(Eq. 14)}$$

If $\lambda^*$ is assigned to p, then the capacities of all paths $\in R_{p,\lambda^*}$ are decreased by 1 and if a path's new capacity equals $C_{min}$, then that path is included in $S_{min}$.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims. The present invention increases network efficiency by allowing more connections to be established over a long time period compared to previously proposed methods. For example, channels could be timeslots in TDMA.

What is claimed is:

1. A method of allocating candidate channel-paths to connections in a network, a candidate channel-path comprising a candidate path and candidate channel along the candidate path, comprising the steps of:

determining individual effects on the network of selecting candidate channel-paths, including effects on at least one channel-path, other than a candidate channel-path, which shares a link with the candidate path;

selecting candidate channel-paths based on a comparison of the determined effects; and allocating the selected candidate channel-paths.

2. A method as in claim 1, wherein the step of determining the effects on the network is based on path capacities which would result from selecting different candidate channel-paths.

3. The method of claim 2 wherein candidate channel-paths apply to a single connection.

4. The method of claim 2 wherein candidate channel-paths apply to multiple connections.

5. A method as in claim 2 wherein the network is an optical fiber network.

6. A method as in claim 5 wherein a channel corresponds to a wavelength.

7. A method as in claim 5 wherein the network comprises a plurality of links, at least one of the links comprising a plurality of optical fibers.

8. A method as in claim 2 wherein a channel corresponds to a timeslot in a time division multiple access system.

9. A method as in claim 2 wherein the network employs at least one channel changer within a path.

10. A method as in claim 1 wherein multiple channels are available in a single path.

11. A method of allocating candidate channel-paths to connections in a network, a candidate channel-path comprising a candidate path and candidate channel along the candidate path, comprising the steps of:

determining, based on path capacity, individual effects on the network of selecting candidate channel-paths, including effects on at least one channel-path, other than a candidate channel-path, which shares a link with the candidate path;

selecting candidate channel-paths based on the determined effects by calculating a sum of path capacity-dependent values of a set of affected paths in the network for each of plural network states resulting from candidate channel-path allocations, and selecting the candidate channel-paths yielding a maximum sum;

allocating the selected candidate channel-paths.

12. A method as in claim 11, wherein each path capacity dependent value is a path capacity multiplied by a weight associated with the path.

13. A method as in claim 12, wherein the weight associated with path p is an inverse of the path capacity of path p prior to allocating channel-paths.

14. A method as in claim 12, wherein the weight for a path p is an inverse of the path capacity of network path p in its empty state with no connections.

15. A method as in claim 12 wherein the weight associated with path p is based on a prediction of future traffic load of path p.

16. A method as in claim 15 wherein the prediction is based on average past traffic load of path p.

17. A method as in claim 11, wherein each path capacity dependent value is a path capacity associated with the path.

18. A method as in claim 17, herein selecting the candidate channel-paths is based on a difference, for each of plural network states resulting from channel-path allocations, of path-capacities before and after the allocation.

19. A method as in claim 18, wherein determining the difference comprises determining a count, for each candidate channel-path, of paths in the network whose capacities are decreased by one.

20. A method as in claim 19 wherein the network is a ring network, and wherein determining the count for a candidate channel-path further comprises:

for each value i between 1 and the number of links n in the candidate channel-path, determining a minimum capacity $k_i$ for a first i links of the candidate channel-path, determining a minimum capacity $g_i$ for a last i links of the candidate channel-path, determining a first gap value $h_i^{(l)}$ equal to a number of links from the first link in candidate channel-path in a first direction to a link with link capacity less than $k_i$, and determining a second gap value $h_i^{(r)}$ equal to a number of links from a last link i in a second direction to the first link with link capacity less than $g_i$; and using $h_i^{(l)}$ and $h_i^{(r)}$, a number of links in the candidate channel-path, and a total number of links in the network, to calculate the count.

21. A method as in claim 19, wherein determining the count for a candidate channel-path further comprises:

for each candidate channel-path, determining a set of paths such that all paths in the set have a minimum capacity link in common with the candidate path at the candidate channel, and using the size of the set of paths as the count.

22. A method of allocating channels to selected paths in a network, each path having multiple candidate channels, comprising the steps of:

determining individual effects on the network of selecting candidate channels for the paths, including effects on at least one path, other than a selected path, which shares a link with a selected path;

selecting the candidate channels based on a comparison of the determined effects; and allocating the selected candidate channels.

23. A method as in claim 22, wherein the step of determining the effects on the network is based on path capacities which would result from selecting different candidate channel-paths.

24. The method of claim 23 wherein candidate channels apply to a single connection.

25. The method of claim 23 wherein candidate channels apply to multiple connections.

26. A method as in claim 23 wherein the network is an optical fiber network.

27. A method as in claim 26 wherein a channel corresponds to a wavelength.

28. A method as in claim 26 wherein the network comprises a plurality of links, at least one of the links comprising a plurality of optical fibers.

29. A method as in claim 23 wherein a channel corresponds to a timeslot in a time division multiple access system.

30. A method as in claim 23 wherein the network employs at least one channel changer within a path.

31. A method of allocating channels to selected paths in a network, each path having multiple candidate channels, comprising the steps of:

determining, based on path capacity, individual effects on the network of selecting candidate channels for the paths;

selecting the candidate channels based on the determined effects by calculating a sum of path capacity-dependent values of a set of affected paths in the network for each of plural network states resulting from candidate channel allocations, and selecting the candidate channels yielding a maximum sum; and allocating the selected candidate channels.

32. A method as in claim 31, wherein each path capacity dependent value is a path capacity multiplied by a weight associated with each selected path.

33. A method as in claim 32, wherein the weight associated with each selected path p is an inverse of the path capacity of path p prior to allocating channels.

34. A method as in claim 32, wherein the weight associated with each selected path p is an inverse of the path capacity of path p in its empty state with no connections.

35. A method as in claim 32 wherein the weight associated with path p is based on a prediction of future traffic load of path p.

36. A method as in claim 35 wherein the prediction is based on average past traffic load at path p.

37. A method as in claim 31, wherein each path capacity dependent value is a path capacity.

38. A method as in claim 3, wherein selecting the candidate channels is based on a difference, for each of plural network states resulting from channel allocations, of path-capacities before and after the allocation.

39. A method as in claim 38, wherein determining the difference comprises determining a count, for each candidate channel, of paths in the network whose capacities are decreased by one.

40. A method as in claim 39 wherein the network is a ring network, and wherein determining the count for a candidate channel along a selected path further comprises:

for each value i between 1 and the number of links n in the path, determining a minimum capacity $k_i$ for a first i links of the path, determining a minimum capacity $g_i$ for a last i links of the path, determining a first gap value $h_i^{(l)}$ equal to a number of links from the first link in the path in a first direction to a link with link capacity less than $k_i$, and determining a second gap value $h_i^{(r)}$ equal to a number of links from a last link i in a second direction to the first link with link capacity less than $g_i$; and using $h_i^{(l)}$ and $h_i^{(r)}$, a number of links in the path, and a total number of links in the network, to calculate the count.

41. A method as in claim 39, wherein determining the count for a candidate channel further comprises:

for each candidate channel, determining a set of paths such that all paths in the set have a minimum capacity link in common with the candidate path at the candidate channel, and using the size of the set of paths as the count.

42. A system for allocating candidate channel-paths to connections in a network, a candidate channel-path comprising a candidate path and candidate channel along the candidate path, comprising:

means for determining individual effects on the network of selecting candidate channel-paths, including effects on at least one channel-path, other than a candidate channel-path, which shares a link with the candidate path;

means for selecting candidate channel-paths based on a comparison of the determined effects; and means for allocating the selected candidate channel-paths.

43. A system for allocating candidate channel-paths to connections in a network, a candidate channel-path comprising a candidate path and candidate channel along the candidate path, comprising:

means for determining, based on path capacity, individual effects on the network of selecting candidate channel-paths, including effects on at least one channel-path, other than a candidate channel-path, which shares a link with the candidate path;

means for selecting candidate channel-paths based on the determined effects, including means for calculating a sum of path capacity-dependent values of a set of affected paths in the network for each of plural network states resulting from candidate channel-path allocations, and means for selecting the candidate channel-paths yielding a maximum sum.; and means for allocating the selected candidate channel-paths.

44. A system for allocating channels to selected paths in a network, each path having multiple candidate channels, comprising:

means for determining individual effects on the network of selecting candidate channels for the paths, including effects on at least one path, other than a selected path, which shares a link with a selected path;

means for selecting the candidate channels based on a comparison of the determined effects; and means for allocating the selected candidate channels.

45. A system for allocating channels to selected paths in a network, each path having multiple candidate channels, comprising: means for determining, based on path capacity, individual effects on the network of selecting candidate channels for the paths;

means for selecting the candidate channels based on the determined effects, said means for selecting including means for calculating a sum of path capacity-dependent values of a set of affected paths in the network for each of plural network states resulting from candidate channel allocations, and means for selecting the candidate channels yielding a maximum sum; and means for allocating the selected candidate channels.

46. A method of allocating candidate channel-paths to connections in a network, a candidate channel-path comprising a candidate path and candidate channel along the candidate path, comprising the steps of:

determining individual effects on the network of selecting candidate channel-paths, including effects on at least one channel-path, other than a candidate channel-path, which shares a link with the candidate path, determining individual effects being based on path capacities which would result from selecting different candidate channel-paths;

selecting candidate channel-paths based on the determined effects, including determining a minimum path capacity of a set of paths in the network for each possible configuration of candidate channel-path allocations, and selecting candidate channel-paths yielding a largest minimum; and allocating the selected candidate channel-paths.

47. The method of claim 46 wherein candidate channel-paths apply to a single connection.

48. The method of claim 46 wherein candidate channel-paths apply to multiple connections.

49. A method as in claim 46 wherein the network is an optical fiber network.

50. A method as in claim 49 wherein a channel corresponds to a wavelength.

51. A method as in claim 49 wherein the network comprises a plurality of links, at least one of the links comprising a plurality of optical fibers.

52. A method as in claim 46 wherein a channel corresponds to a timeslot in a time division multiple access system.

53. A method as in claim 46 wherein the network employs at least one channel changer within a path.

54. A method as in claim 46 wherein multiple channels are available in a single path.

55. A method of allocating channels to selected paths in a network, each path having multiple candidate channels, comprising the steps of:

determining individual effects on the network of selecting candidate channels for the paths, based on path capacities which would result from selecting different candidate channel-paths;

selecting the candidate channels based on the determined effects, including determining a minimum path capacity of a set of paths in the network for each of plural network states resulting from candidate channel allocations, and selecting the candidate channels yielding a largest minimum; and allocating the selected candidate channels.

56. The method of claim 55 wherein candidate channels apply to a single connection.

57. The method of claim 55 wherein candidate channels apply to multiple connections.

58. A method as in claim 55 wherein the network is an optical fiber network.

59. A method as in claim 58 wherein a channel corresponds to a wavelength.

60. A method as in claim 58 wherein the network comprises a plurality of links, at least one of the links comprising a plurality of optical fibers.

61. A method as in claim 55 wherein a channel corresponds to a timeslot in a time division multiple access system.

62. A method as in claim 55 wherein the network employs at least one channel changer within a path.

* * * * *

UNITED STATES PATENT AND TRADEMARK OFFICE
CERTIFICATE OF CORRECTION

PATENT NO. : 6,538,777 B1  Page 1 of 1
DATED : March 25, 2003
INVENTOR(S) : Richard A Barry and Suresh Subramaniam It is certified that error appears in the above-identified patent and that said Letters Patent is hereby corrected as shown below:

<u>Column 13,</u>
Line 17, insert -- and -- after the word "sum;".

<u>Column 14,</u>
Line 64, delete "3" and insert -- 31 --.

Signed and Sealed this

Twenty-sixth Day of August, 2003

JAMES E. ROGAN
*Director of the United States Patent and Trademark Office*